United States Patent

Furukawa et al.

[11] Patent Number: 5,796,691
[45] Date of Patent: Aug. 18, 1998

[54] SPINDLE SERVO SYSTEM FOR ADJUSTING ROTATIONAL SPEED IN OPTICAL DISK PLAYER

[75] Inventors: Junichi Furukawa; Kiyoshi Tateishi, both of Turugashima, Japan

[73] Assignee: Pioneer Electronic Corporation, Tokyo, Japan

[21] Appl. No.: 773,034

[22] Filed: Dec. 24, 1996

[30] Foreign Application Priority Data

Dec. 28, 1995 [JP] Japan ................................. 7-343243

[51] Int. Cl.$^6$ ................................................ G11B 5/09
[52] U.S. Cl. ........................................ 369/50; 369/59
[58] Field of Search .............................. 369/50, 59, 54, 369/48, 47, 32

[56] References Cited

U.S. PATENT DOCUMENTS

| | | | |
|---|---|---|---|
| 4,539,667 | 9/1985 | Fujiie | 369/59 |
| 5,383,171 | 1/1995 | Mizokami et al. | 369/59 |
| 5,615,188 | 3/1997 | Ishida et al. | 369/59 |

*Primary Examiner*—Nabil Hindi
*Attorney, Agent, or Firm*—Morgan, Lewis, & Bockius LLP

[57] ABSTRACT

A spindle servo system roughly adjusts a rotational speed of a spindle motor for rotationally driving an optical disk at a specified speed in an optical disk player for reproducing digital data composed of run length limited codes and synchronizing signals, wherein the run length limited codes are restricted between a minimum run length and a maximum run length, and wherein the synchronizing signals are composed of a maximum bit pattern with a run length longer than the maximum run length and an additional bit pattern disposed just before or after the maximum bit pattern with a run length longer than the minimum run length and shorter than the maximum run length, the spindle servo system. The spindle servo system includes a pickup detector for reading the digital data from the optical disk; pattern detecting means for detecting a synchronizing signal composed of the maximum bit pattern and the additional bit pattern from the digital data read by the pickup detector; period detecting means for detecting a period of the synchronizing signal, the period including the maximum bit pattern and the additional bit pattern detected by the pattern detector; and motor for controlling the rotational speed of the spindle motor to maintain the period detected by the period detector at a predetermined value.

4 Claims, 4 Drawing Sheets

SPINDLE SERVO SYSTEM FOR ADJUSTING ROTATIONAL SPEED IN OPTICAL DISK PLAYER

BACKGROUND OF THE INVENTION

1. Field of the Invention

The present invention relates to a spindle servo system for adjusting a rotational speed of a spindle motor in a disk player, and more particularly, to a spindle servo system for rough adjustment of the spindle speed.

2. Description of the Related Art

In a player for reproducing digitally recorded data from an optical disk such as a CD (compact disk), the rotational speed of a spindle motor for rotationally driving the optical disk is controlled by a spindle servo so that the rotational speed of the optical disk is adjusted to a specified speed. In a CD, this specified speed at which the linear velocity of the tracks is fixed. In the spindle servo, rough adjustment is normally carried out first. That is, a read signal read from the optical disk by a pickup is compared with a slice level to convert it into a binary signal of "1" or "0". A maximum period or a maximum inversion internal (it is a pit portion of a synchronizing signal and is called as a maximum run length) of the binary signal is detected and the spindle motor is driven so that the maximum period or the maximum inversion interval thereof becomes equal to a predetermined reference value. When the maximum inversion interval or the maximum period thereof becomes equal to the predetermined reference value and the rough adjustment is locked, fine adjustment is carried out. The synchronizing signal recorded in the optical disk is sampled to compare its phase with that of a reference oscillation signal to drive the spindle motor in accordance with the result of comparison of the phases.

A recent proposal was to adopt "14T–4T," for example, as a synchronizing signal pattern to be used for rough adjustment of the spindle servo in a digital video disk (DVD). Here, (T) denotes a unit bit length, (14T) is a bit length of a maximum bit pattern longer than a maximum run length of digital data, i.e., the maximum inversion interval, and (4T) denotes an additional inversion interval of an additional bit pattern whose length is shorter than the maximum run length and longer than the minimum run length of the digital data. It is noted that (–) is used not as a symbol of subtraction but as a symbol that (4T) follows (14T). However, descriptions such as (14T+4T) are made in embodiments described later where (+) is used to mean that (14T) is added with (4T).

There has been a problem in the DVD in that the period of 18T of the synchronizing signal pattern of 14T –4T described above is shorter than the maximum period of 22T (11T–1T) within the data. Thus, the spindle servo of the method of detecting the maximum period of the binary signal cannot be applied to it. For synchronizing signal patterns in this section, the servo control section has been adapted to output a control voltage of 0 V to a spindle motor driving circuit to decelerate the rotation of the spindle when a maximum value of a run length of a bit pattern detected within a certain section in reading a signal recorded in the disk is 15T and over, and to output a control voltage of 5 V to the spindle motor driving circuit to accelerate the rotation of the spindle motor when the maximum value is 13T and below. Further, the servo control section has been adapted to output a control voltage of 2.5 V to the spindle motor driving circuit to maintain the rotation of the spindle motor when the maximum value is 14T.

However, because the slice level in binarizing the signal read from the disk is set so that a DC component of the binary signal, zero for example, is based on the output binary signal, the slice level fluctuates subtly corresponding to the binary signal even if the spindle motor rotates adequately. For example, the synchronizing signal pattern detected with respect to 14T–4T described above may become a pattern of 13T–5T or of 15T–3T. As a result, problems occur in stabilizing the spindle servo because the fluctuating synchronizing signal pattern causes acceleration or deceleration of the spindle motor.

SUMMARY OF THE INVENTION

Accordingly, the present invention is directed to a spindle servo system of an optical disk player that substantially obviates one or more of the problems due to limitations and disadvantages of the related art.

An object of the present invention to provide a spindle servo system which can roughly adjust the rotational speed of the spindle motor adequately to a specified value in a player for reproducing digital data on an optical disk in which synchronizing signal patterns composed of a minimum bit pattern and an additional bit pattern are recorded together with digital data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the spindle servo system roughly adjusts a rotational speed of a spindle motor for rotationally driving an optical disk at a specified speed in an optical disk player for reproducing digital data composed of run length limited codes and synchronizing signals, the run length limited codes restricted between a minimum run length and a maximum run length, the synchronizing signals composed of a maximum bit pattern with a run length longer than the maximum run length and an additional bit pattern disposed just after the maximum bit pattern with a run length longer than the minimum run length and shorter than the maximum run length, the spindle servo system. The spindle servo system includes pickup means for reading the digital data from the optical disk; pattern detecting means for detecting a synchronizing signal composed of the maximum bit pattern and the additional bit pattern from the digital data read by the pickup means; period detecting means for detecting a period of the synchronizing signal, the period including the maximum bit pattern and the additional bit pattern detected by the pattern detecting means; and motor control means for controlling the rotational speed of the spindle motor to maintain the period detected by the period detecting means at a predetermined value.

In another aspect, the spindle servo system roughly adjusts a rotational speed of a spindle motor for rotationally driving an optical disk at a specified speed in an optical disk player for reproducing digital data composed of run length limited codes and synchronizing signals, the run length limited codes restricted between a minimum run length and a maximum run length, the synchronizing signals composed of a maximum bit pattern with a run length longer than the maximum run length and an additional bit pattern disposed just before the maximum bit pattern with a run length longer than the minimum run length and shorter than the maximum run length, the spindle servo system. The spindle servo system includes pickup means for reading the digital data from the optical disk; pattern detecting means for detecting a synchronizing signal composed of the additional bit pattern and the maximum bit pattern from the digital data read by the pickup means; period detecting means for detecting a period of the synchronizing signal, the period including the additional bit pattern and the maximum bit pattern detected by the pattern detecting means; and motor control means for controlling the rotational speed of the spindle motor to maintain the period detected by the period detecting means at a predetermined value.

According to one aspect of the present invention, in an optical disk player for reproducing digital data from an optical disk in which the digital data composed of run length limited codes that meet with the restriction of a minimum run length and a maximum run length and synchronizing signals whose one period is a pattern composed of a maximum bit pattern having a run length longer than the maximum run length and an additional bit pattern disposed just after the maximum bit pattern and having a run length which is longer than the minimum run length and shorter than the maximum run length are recorded, an inventive spindle servo system for roughly adjusting a rotational speed of a spindle motor for rotationally driving the optical disk to a specified speed comprises pattern detecting means for detecting the pattern composed of the maximum bit pattern and the additional bit pattern from the read signal read from the optical disk by pickup means; period detecting means for detecting a period made up by the maximum bit pattern and the additional bit pattern detected by the pattern detecting means; and motor control means for adjusting the rotational speed of the spindle motor so that the value of period detected by the period detecting means becomes equal to a predetermined value.

According to another aspect of the present invention, in an optical disk player for reproducing digital data from an optical disk in which the digital data composed of run length limited codes that meet with the restriction of a minimum run length and a maximum run length and synchronizing signals whose one period is a pattern composed of a maximum bit pattern having a run length longer than the maximum run length and an additional bit pattern disposed just before the maximum bit pattern and having a run length which is longer than the minimum run length and shorter than the maximum run length are recorded, an inventive spindle servo system for roughly adjusting a rotational speed of a spindle motor for rotationally driving the optical disk to a specified speed comprises pattern detecting means for detecting the pattern composed of the additional bit pattern and the maximum bit pattern from the read signal read from the optical disk by pickup means; period detecting means for detecting a period made up by the additional bit pattern and the maximum bit pattern detected by the pattern detecting means; and motor control means for adjusting the rotational speed of the spindle motor so that the value of period detected by the period detecting means becomes equal to a predetermined value.

According to the present invention, the period of the synchronizing signal composed of the maximum bit pattern and the additional bit pattern detected respectively from the signal read from the optical disk is obtained to perform spindle servo control corresponding to that period.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF PREFERRED EMBODIMENTS

Reference will now be made in detail to the preferred embodiments of the present invention, examples of which are illustrated in the accompanying drawings.

Figure 1:
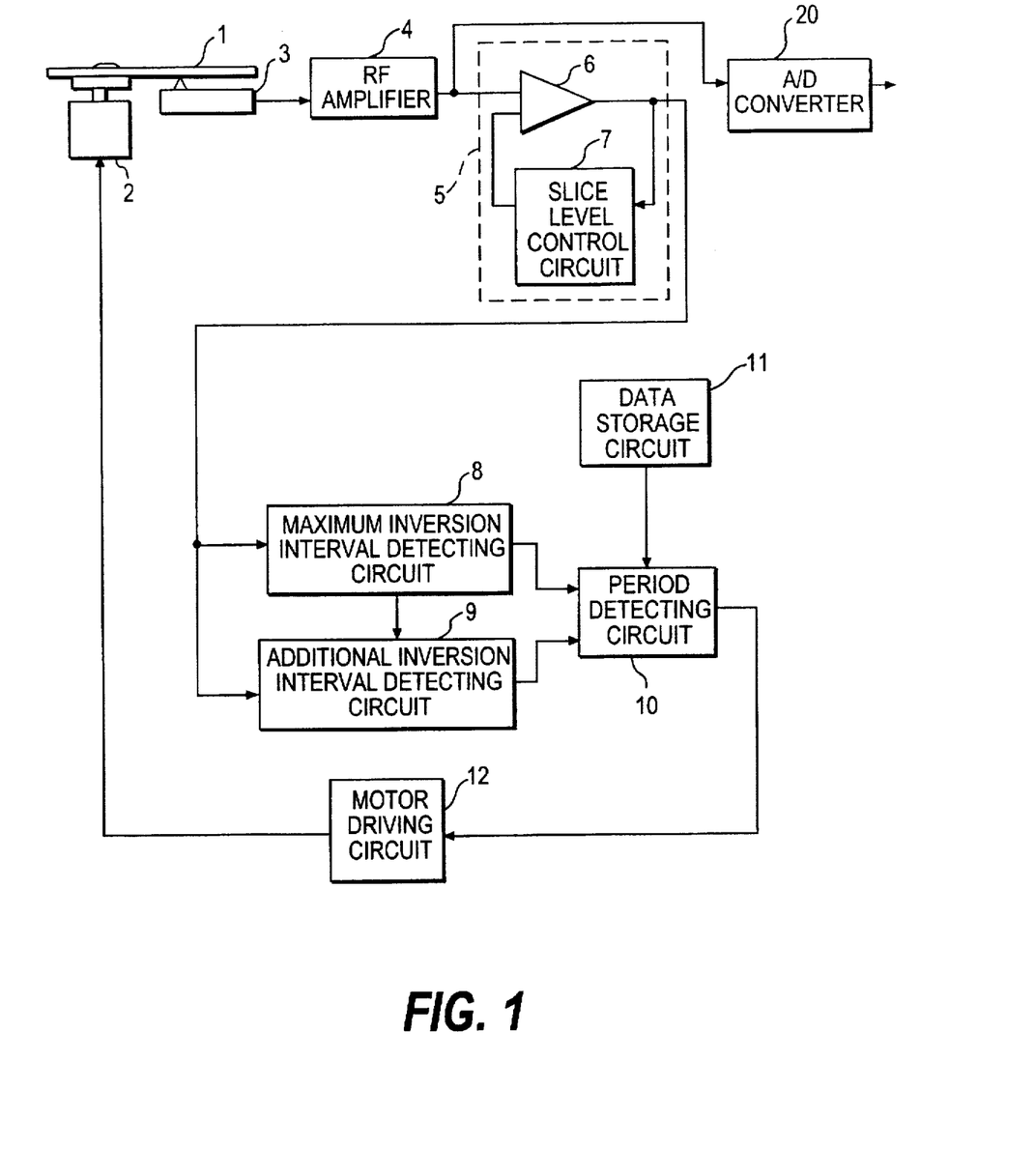
FIG. 1 is a block diagram showing a preferred embodiment of the present invention.

FIG. 1 shows an optical disk player having a spindle servo system according to the present invention. A discoid optical disk 1 set in the optical disk player is a CLV type disk which contains information signals, which are digital data recorded at a fixed linear velocity and rotationally driven by a spindle motor 2. The digital data recorded in the optical disk 1 is read optically by a pickup 3. The read signal, which is an RF signal outputted from the pickup 3, is an analog signal indicating a quantity of a reflected potion received from the optical disk 1 of an optical beam irradiated in the pickup 3. It is amplified by an RF amplifier 4 and is then binarized by a binarizing circuit 5. The output signal of the RF amplifier 4 is also digitized by an A/D converter 20 and is then supplied to a signal reproducing system.

The binarizing circuit 5 comprises a comparator 6 and a slice level control circuit 7. The comparator 6 compares the output level of the RF amplifier 4 with a threshold value of the slice level set by the slice level control circuit 7. The slice level control circuit 7 controls the slice level so that the DC level of the output signal of the comparator 6 becomes 0.

Connected to the output of the binarizing circuit 5 are a maximum inversion interval detecting circuit 8 and an additional inversion interval detecting circuit 9. The maximum inversion interval detecting circuit 8 measures an interval from a time of rise to a time of the next fall of the output signal of the binarizing circuit 5 or an interval from a time of fall to a time of the next rise individually by counting clock pulses from a counter, and outputs a maximum value of the measured interval as a value of maximum inversion interval. The maximum inversion interval detecting circuit 8 also supplies a detected signal indicating when the maximum value is detected to the additional inversion interval detecting circuit 9 as the maximum value is detected. The additional inversion internal detecting circuit 9 is provided to detect an inversion interval that follows the maximum inversion interval detected by the maximum inversion interval detecting circuit 8. That is, it measures an interval from a time of fall to a time of next rise of the output signal of the binarizing circuit 5 or an interval from a time of rise to a time of next fall corresponding immediately to the detected signal from the maximum inversion interval detecting circuit 8 individually by counting clock pulses from a counter. The additional interval detecting circuit 9 then outputs the measured interval as a value of additional inversion interval.

The value of maximum inversion interval from the maximum inversion interval detecting circuit 8 and the value of additional inversion interval from the additional inversion interval detecting circuit 9 are supplied to a period detecting circuit 10. The period detecting circuit 10 operates as a comparison circuit and generates a control voltage which indicates an error between the values of maximum inversion interval and of additional inversion interval and a reference value. A data storage circuit 11, in which a relationship between the period and the error is stored beforehand as data is connected to the period detecting circuit 10, and the period detecting circuit 10 generates the control voltage by making reference to the stored data. The control voltage of the period detecting circuit 10 is supplied to a motor driving circuit 12 for driving the spindle motor 2.

The reference value is 14T+4T. Here, (14T) denotes a bit length of a maximum bit pattern longer than a maximum run length of digital data, i.e., a maximum inversion interval, and (4T) denotes an additional inversion interval of an additional bit pattern which follows the maximum bit pattern. Its length is shorter than the maximum run length and longer than the minimum run length of the digital data. The period of the synchronizing signal is 18T.

The operation of the spindle servo system in accordance with the present invention will now be explained. The pickup 3 reads the recorded signal composed as a train of pits on the optical disk 1 and the read signal is amplified by the RF amplifier 4 and is then binarized by the binarizing circuit 5. The output signal of the binarizing circuit 5 becomes a high level when a pit portion of the optical disk 1 is read and becomes a low level when a land portion is read. The maximum inversion interval detecting circuit 8 detects a maximum inversion interval of the read signal corresponding to the output signal of the binarizing circuit 5, which changes. The output signal indicating the value of maximum inversion interval detected by the maximum inversion interval detecting circuit 8 is supplied to the period detecting circuit 10. Because the maximum inversion interval detecting circuit 8 generates a detected signal when the maximum inversion interval is detected, the additional inversion interval detecting circuit 9 operates corresponding to the detected signal and detects an inversion interval, which follows the maximum inversion interval detected by the maximum inversion interval detecting circuit 8. The output signal of the additional inversion interval detecting circuit 9 indicating the value of additional inversion interval detected is also supplied to the period detecting circuit 10.

As an example, assume that the detected value of maximum inversion interval is 'A' and the detected value of additional inversion interval as 'B'. The period detecting circuit 10 determines to which domain the period "A+B" belongs. The relationship between the control voltages and the periods shown in Table 1 is stored in the data storage circuit 11. In each period shown in Table 1, 'A' corresponds to a value before '+', 'B' corresponds to a value after '+', and '*' shows that it may take any value.

TABLE 1

| Control Voltage | 0 v | 2.5 V | 5 V |
| --- | --- | --- | --- |
| A + B | 12T and below +* | 13T + 5T | 16T and over+* |
|  | 13T + 4T and below | 14T + 4T | 15T + 2T and below |
|  | 13T + 6T and over | 15T + 3T | 15T + 4T and over |
|  | 14T + 3T | 14T + 1T | 14T + 5T |
|  |  | 14T + 2T |  |
|  |  | 14T + 6T and over |  |

Figure 2:
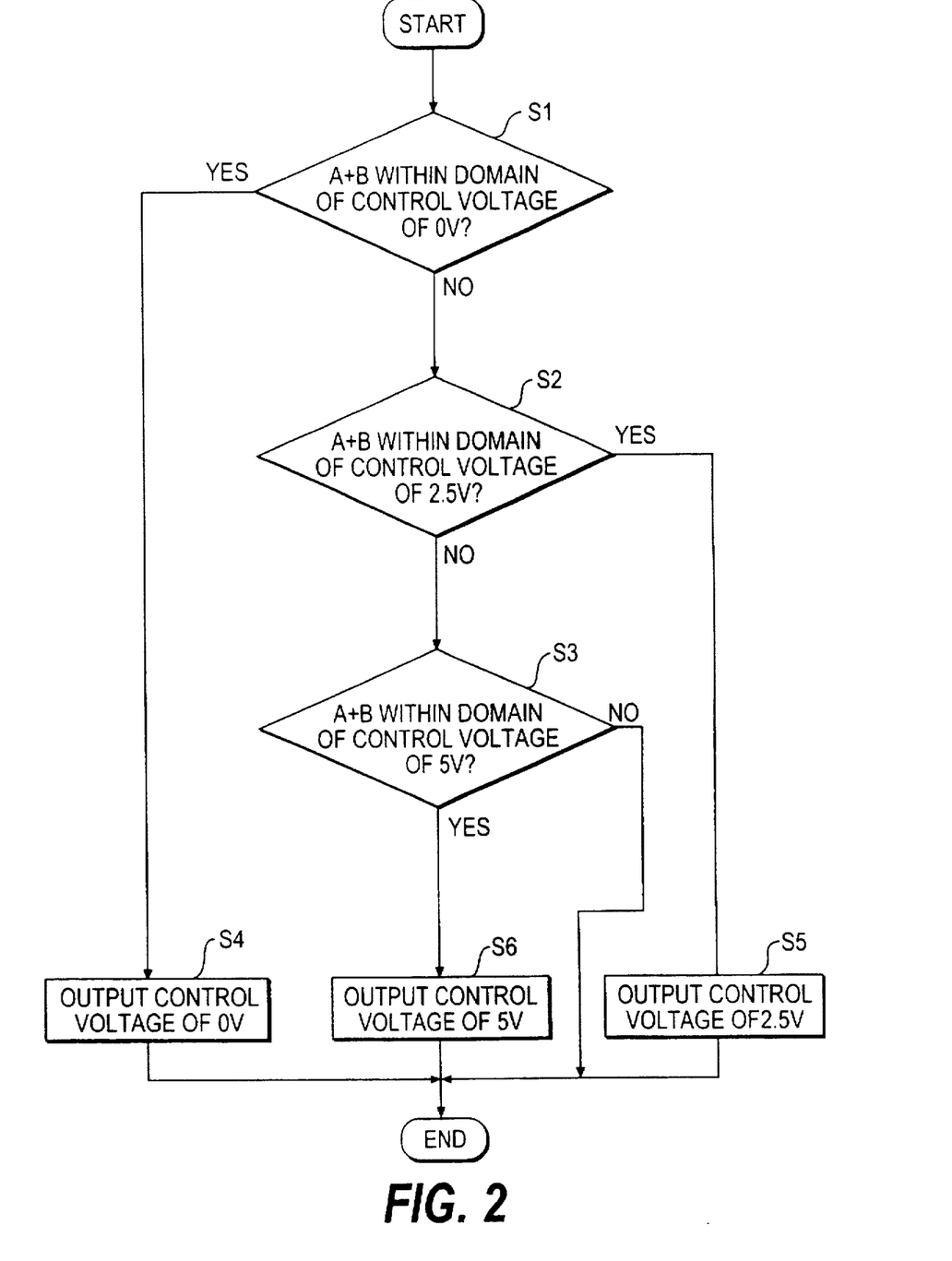
FIG. 2 is a flowchart showing an operation of a period detecting circuit within the system in FIG. 1.

Accordingly, the period detecting circuit 10 operates as shown in FIG. 2 every time "A+B" is supplied. The determination is made as to whether "A+B" belongs to a domain of control voltage of 0 V (Step S1), whether "A+B" belongs to a domain of control voltage of 2.5 V (Step S2), and whether "A+B" belongs to a domain of control voltage of 5 V (Step S3). As a result, when "A+B" belongs to the domain of control voltage of 0 V, the period detecting circuit 10 supplies the control voltage of 0 V to the motor driving circuit 12 to decelerate the rotation of the spindle motor 2 because the rotational speed of the optical disk 1 is fast (Step S4), when "A+B" belongs to the domain of control of 2.5 V, the period detecting circuit 10 supplies the control voltage of 2.5 V to the motor driving circuit 12 to maintain the present rotational speed of the spindle motor 2 because the rotational speed of the optical disk 1 is adequate (Step S5), and when "A+B" belongs to the domain of control voltage of 5 V, the period detecting circuit 10 supplies the control voltage of 5 V to the motor driving circuit 12 to accelerate the rotational speed of the spindle motor 2 because the rotational speed of the optical disk 1 is slow (Step S6).

Determining all of the steps of S1 through S3 is not necessary as determining two of the steps is sufficient. If Steps S1 and S2 yield "NO", for example, "A+B" belongs to the domain of control voltage of 5 V.

The motor driving circuit 12 rotates the spindle motor 2 corresponding to the control voltage supplied from the period detecting circuit 10. Accordingly, the spindle motor 2 is decelerated when "A+B" belongs to the domain of control voltage of 0 V and is accelerated when "A+B" belongs the domain of control voltage of 5 V. Because the operation is repeatedly carried out, the rotational speed of the optical disk 1 which is rotationally driven by the spindle motor 2 is maintained at a fixed linear velocity.

Figure 3A:
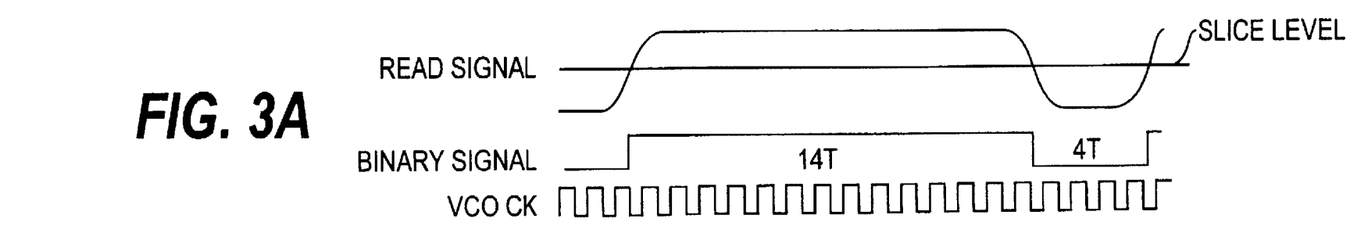
FIGS. 3A through 3C are waveform charts showing respective binary signals obtained with respect to a read signal of a synchronizing signal pattern.
Figure 3B:
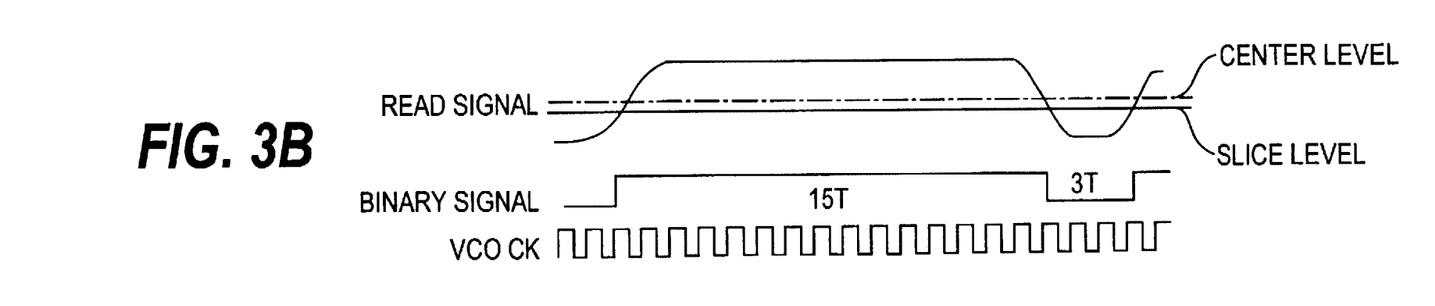
Figure 3C:
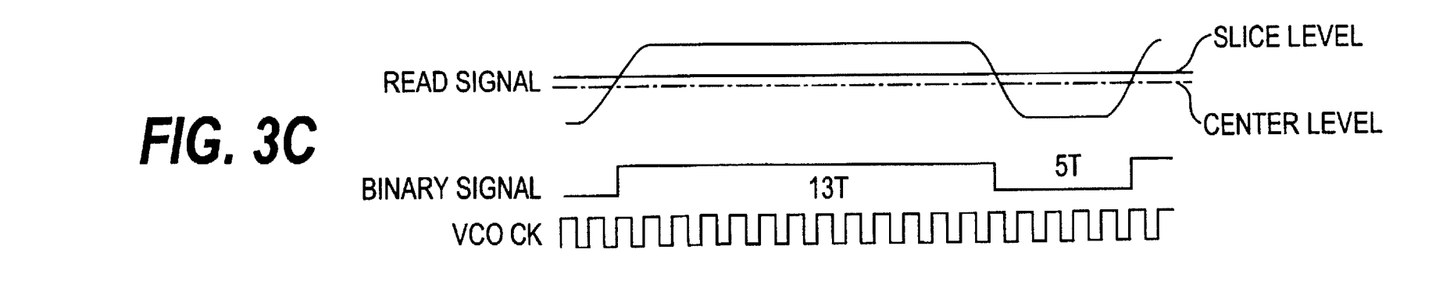

FIGS. 3A through 3C show binary signals obtained with respect to the read signal of the synchronizing signal pattern. FIG. 3A shows a case when the center level of the read signal coincides with the slice level and a binary signal of 14T–4T is obtained. FIG. 3B shows the case when the slice level fluctuates to the level lower than the center level of the read signal and a binary signal of 15T–3T is obtained. FIG. 3C shows a case when the slice level fluctuates to the level higher than the center level of the read signal and a binary signal of 13T–5T is obtained. Accordingly, even if the synchronizing signal pattern is not correctly detected as shown in FIGS. 3B and 3C, the period detecting circuit 10 generates the control voltage of 2.5 V and the present rotational speed of the spindle motor 2 is maintained by using the spindle servo system of the present embodiment described above. The present invention detects the control target of the spindle motor adequately as the period of 18T of the synchronizing signal pattern. That is, it brings about an effect that the control of the spindle is not disturbed even if the slice level fluctuates. The signal (VCO CK) in FIGS. 3A through 3C denotes a clock pulse indicating the unit bit length T.

Also, in Table 1, while the domain of the control voltage of 2.5 V is the domain to which the period "A+B" basically belongs when it is equal to 18T. Periods of 14T+1T, 14T+2T, and 14T+6T and over are also included in that domain. Further, while the domain of the control voltage of 0 V is the domain to which the period "A+B" basically belongs when it is 17T and below, and 13T+6T and over is also included in that domain. While the domain of the control voltage of 5 V is the domain to which the period "A+B" basically belongs when it is 19T and over, 15T+2T and below is also included in that domain. Such periods are included because an additional bit pattern may have been detected erroneously due to a defect or flaw in the disk.

Although the control voltages of only three voltages of 0 V, 2.5 V and 5 V are generated according to Table 1 described above, the present invention is not confined only to those three values. That is, a number of values of control voltages may be increased to five, for example, as shown in Table 2.

TABLE 2

| Control Voltage | 0 V | 1.25 V | 2.5 V | 3.75 V | 5 V |
| --- | --- | --- | --- | --- | --- |
| A + B | 12T and below+* | 13T+*except ST<br>14T + 3T | 13T + ST<br>14T + 4T<br>15T + 3T<br>14T + 1T<br>14T + 2T<br>14T + 6T and over | 14T + 5T<br>15T +*<br>except 3T | 16T and over+* |

In this case, respective domains of control voltages of 1.25 V and 3.75 V are added. While the control voltage of 1.25 V is a voltage that decelerates the rotation of the spindle motor 2 by the motor driving circuit 12, it decelerates a little and not as much as control voltage of 0 V. Further, while the control voltage of 3.75 V is a voltage that accelerates the rotation of the spindle motor 2, it accelerates a little and not as much as the case of the control voltage of 5 V. The spindle motor may be driven and adjusted accurately to a desired speed by multi-valuing the control voltages to five or so.

Figure 4:
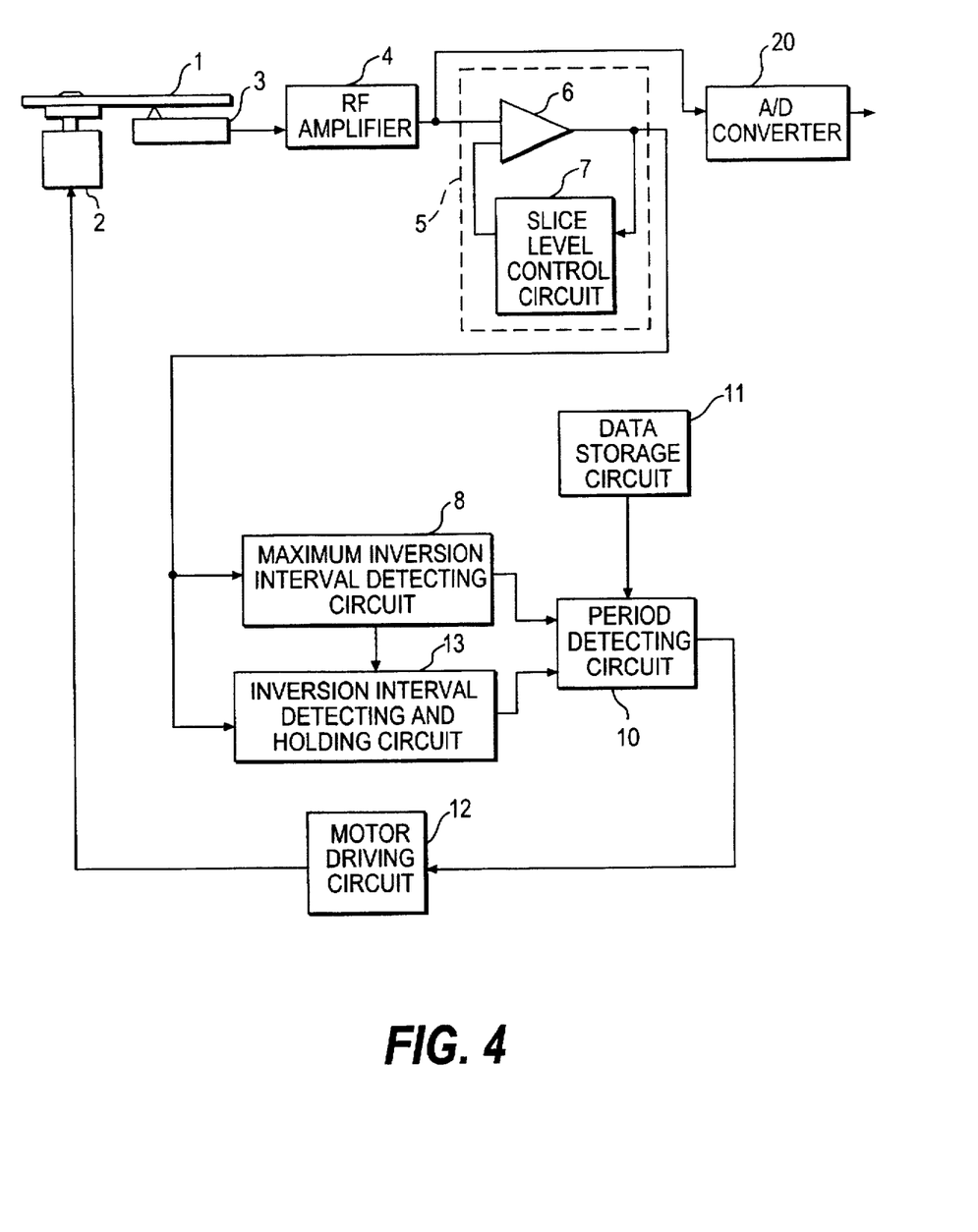
FIG. 4 is a block diagram showing another embodiment of the present invention.

FIG. 4 shows another embodiment of the present invention. In the present embodiment, a period of a synchronizing signal recorded in the optical disk 1 is 4T+14T. That is, the additional bit pattern is positioned just before the maximum bit pattern in the optical disk 1. In FIG. 4, the same components with those shown in FIG. 1 are denoted by the same reference numerals. An inversion interval detecting and holding circuit 13 is connected to the output of the binarizing circuit 5 together with the maximum inversion interval detecting circuit 8. The inversion interval detecting and holding circuit 13 measures an interval from a time of rise to a time of next fall or an interval from a time of fall to a time of next rise of the output signal of the binarizing circuit 5 individually by counting clock pulses by a counter, holds the measured interval values sequentially, and outputs the inversion interval value just before the maximum inversion internal as a value of additional inversion interval when the detected signal is supplied from the maximum inversion interval detecting circuit 8. Each output of the maximum inversion interval detecting circuit 8 and the inversion interval detecting and holding circuit 13 is output to the period detecting circuit 10. Assuming that the detected value of maximum inversion interval is 'A' and that the detected value of additional inversion interval is 'B', the period detecting circuit 10 is operated in the same manner with the case shown in FIG. 1. The other mechanisms are also the same with those in FIG. 1.

It is noted that although the synchronizing signal pattern has been composed of the bit pattern of the maximum run length of 14T and the bit pattern of the additional run length of 4T in the embodiments described above, the present invention is not confined only to that. That is, the synchronizing signal pattern may be composed of a bit pattern having a run length longer than the maximum run length of digital data and a bit pattern added to it, whose length is above the minimum run length and below the maximum run length.

As described above, according to the inventive spindle servo system of the optical disk player, the period of the synchronizing signal composed of the maximum bit pattern and the additional bit pattern each detected from the read signal is obtained to carry out the spindle servo control corresponding to that period, so that the rotational speed of the spindle motor may be roughly adjusted adequately to a specified speed and the rotational speed of the disk may be stabilized even when the slice level fluctuates in the player for reproducing data from the optical disk such as DVD.

It will be apparent to those skilled in the art that various modifications and variations can be made in the spindle servo system of optical disk player of the present invention without departing from the spirit or scope of the invention. Thus, it is intended that the present invention cover the modifications and variations of this invention provided they come within the scope of the appended claims and their equivalents.

What is claimed is:

1. A spindle servo system for roughly adjusting a rotational speed of a spindle motor for rotationally driving an optical disk at a specified speed in an optical disk player for reproducing digital data composed of run length limited codes and synchronizing signals, the run length limited codes restricted between a minimum run length and a maximum run length, the synchronizing signals composed of a maximum bit pattern with a run length longer than the maximum run length an an additional bit pattern disposed just after the maximum bit pattern with a run length longer than the minimum run length and shorter than the maximum run length, the spindle servo system comprising:

a pickup for reading the digital data from the optical disk;

pattern detecting means for detecting a synchronizing signal composed of the maximum bit pattern and the additional bit pattern from the digital data read by the pickup;

period detecting means for detecting a period of the maximum bit pattern and the additional bit pattern in the synchronizing signal detected by the pattern detecting means; and motor control means for controlling die rotational speed of the spindle motor according to the period of the maximum bit pattern and the additional bit pattern in the synchronizing signal detected by the period detecting means.

2. The spindle servo system of the optical disk player according to claim 1, wherein the pattern detecting means comprises:

maximum bit pattern detecting means for detecting a bit pattern whose run length is longer than the maximum run length as the maximum bit pattern from the read signal; and additional bit pattern detecting means for detecting a bit pattern just after the maximum bit pattern as the additional bit pattern.

3. A spindle servo system for roughly adjusting a rotational speed of a spindle motor for rotationally driving an optical disk at a specified speed in an optical disk player for reproducing digital data composed of run length limited codes and synchronizing signals, the run length limited codes restricted between a minimum run length and a maximum run length, the synchronizing signals composed of a maximum bit pattern with a run length longer than the maximum run length and an additional bit pattern disposed just before the maximum bit pattern with a run length longer than the minimum run length and shorter than it maximum run length, the spindle servo system comprising:

a pickup for reading the digital data from the optical disk;

pattern detecting means for detecting a synchronizing signal composed of the additional bit pattern and the maximum bit pattern from the digital data read by the pickup;

period detecting means for detecting a period of the additional bit pattern and the maximum bit pattern in the synchronizing signal detected by the pattern detecting means; and motor control means for controlling the rotational speed of the spindle motor according to period of the additional bit pattern and the magnum bit pattern in the synchronizing signal detected by the period detecting means.

4. The spindle servo system of the optical disk player according to claim 3, wherein the pattern detecting means comprises:

maximum bit pattern detecting means for detecting a bit pattern whose run length is longer than the maximum run length as the maximum bit pattern from the read signal; and additional bit pattern detecting means for detecting and holding bit patterns sequentially from the read signal and outputting a pattern held just before when the maximum bit pattern detecting means detects the maximum bit pattern as the additional bit pattern.

* * * * *

UNITED STATES PATENT AND TRADEMARK OFFICE
CERTIFICATE OF CORRECTION

PATENT NO. : 5,796,691
DATED : August 18, 1998
INVENTOR(S) : Furukawa et al.

It is certified that error appears in the above-identified patent and that said Letters Patent is hereby corrected as shown below:

Title page, In Item [57] ABSTRACT:

Line 13, delete "detector".

Line 14, change "detecting" to --detector--.

Line 15, delete "means".

Line 17, delete "detector" and change "detecting" to --detector--.

Line 18, delete "means".

Line 20, after "motor" insert --controller--.

Column 8, Line 39, change "die" to --the--;

Line 64, change "it" to --the--.

Column 9, Line 10, after "to" insert --the--;

Line 11, change "magnum" to --maximum--.

Signed and Sealed this

Twenty-sixth Day of January, 1999

Attest:

Attesting Officer

*Acting Commissioner of Patents and Trademarks*